United States Patent
Michaelis

(10) Patent No.: US 9,336,935 B2
(45) Date of Patent: May 10, 2016

(54) LEVITATION DEVICE WITH HORIZONTAL SPIN AXIS

(71) Applicant: Maximilian Michaelis, Thame (GB)

(72) Inventor: Maximilian Michaelis, Thame (GB)

(*) Notice: Subject to any disclaimer, the term of this patent is extended or adjusted under 35 U.S.C. 154(b) by 0 days.

(21) Appl. No.: 14/416,708

(22) PCT Filed: Jul. 22, 2013

(86) PCT No.: PCT/GB2013/051953
§ 371 (c)(1),
(2) Date: Jan. 23, 2015

(87) PCT Pub. No.: WO2014/016575
PCT Pub. Date: Jan. 30, 2014

(65) Prior Publication Data
US 2015/0213934 A1    Jul. 30, 2015

(30) Foreign Application Priority Data
Jul. 23, 2012 (GB) .................................. 1213050.6

(51) Int. Cl.
*H02N 15/00* (2006.01)
*H01F 7/02* (2006.01)

(52) U.S. Cl.
CPC ............. *H01F 7/0236* (2013.01); *H02N 15/00* (2013.01)

(58) Field of Classification Search
CPC ............................. H01F 7/0236; H02N 15/00
USPC .......................................................... 310/90.5
See application file for complete search history.

(56) References Cited

U.S. PATENT DOCUMENTS

| 4,382,245 | A | | 5/1983 | Harrigan |
| 5,043,615 | A | | 8/1991 | Oshima |
| 5,182,533 | A | * | 1/1993 | Ritts .............................. 335/306 |
| 5,404,062 | A | | 4/1995 | Hones et al. |
| 6,356,000 | B1 | | 3/2002 | Ho et al. |
| 2007/0205854 | A1 | | 9/2007 | Kazadi |
| 2009/0079526 | A1 | | 3/2009 | Tong et al. |
| 2009/0184595 | A1 | | 7/2009 | Farber |

FOREIGN PATENT DOCUMENTS

EP    0413497    2/1991

OTHER PUBLICATIONS

M.V.Berry, "The Levitron: an adiabatic trap for spins". Proc. Roy. Soc. London, Ser. A 452, 1207-1220 (1996).
M.D.Simon, I.O.Heflinger and S.L.Ridgway, "Spin stabilized magnetic levitation". Am.J.Phys. 65(4), 286-292 (1997).
L.A.Romero. "Spin stabilized magnetic levitation of horizontal rotors". SIAM.J. Appl.Math.63 (6), 2176-2194 (2003).

* cited by examiner

Primary Examiner — Ramon M Barrera
(74) Attorney, Agent, or Firm — Quarles & Brady, LLP

(57) ABSTRACT

A levitation device including an object levitatable at a predetermined position, wherein the object comprises a spinning magnet, the spinning magnet having a substantially horizontal spin axis defining an axial direction and the spinning magnet having a magnetization direction parallel to the spin axis, the device further comprising: a pusher magnet arrangement configured to produce a magnetic field at the predetermined position that is in the opposite direction to the magnetization direction of said spinning magnet; a lifter magnet arrangement lower than and to either side of the predetermined position, having a magnetization direction parallel to the magnetization direction of the spinning magnet, and having a recess under the predetermined position; and a puller magnet arrangement above said predetermined position and having a magnetization direction antiparallel to the magnetization direction of the spinning magnet.

15 Claims, 4 Drawing Sheets

LEVITATION DEVICE WITH HORIZONTAL SPIN AXIS

CROSS-REFERENCE TO RELATED APPLICATIONS

This application represents the national stage entry of PCT International Application No. PCT/GB2013/051953 filed Jul. 22, 2013, which claims priority of Great Britain Patent Application No. 1213050.6, filed Jul. 23, 2012, the disclosures of which are incorporated by reference here in their entirety for all purposes.

This invention relates to a device for magnetically levitating an object.

R M Harrigan first demonstrated, against all odds, a freely spinning levitated magnetic top. The idea was patented in 1983 (U.S. Pat. No. 4,382,245), and commercialized under the name "Levitron" (trade mark). FIG. 1a shows an example of such a device comprising a spinning magnet 10 (referred to herein as a "spignet") supported by a magnetic base 11 having an opposite magnetization direction. However, progress with levitation device experiments and theory over a third of a century, has been hesitant. Only minor experimental changes were made-chiefly to the magnetic base. Ring magnets rather than square were employed (FIG. 1b) and with the advent of cheap and stronger magnets impressive levitation heights of about 10 cm (as opposed to two or three), were demonstrated and commercialized.

Early theory was misleading, concentrating on the apparent contradiction with Earnshaw's theorem. The correct stabilization mechanism was first proposed in 1996 by M. V. Berry, "The Levitron: an adiabatic trap for spins". Proc. Roy.Soc. London, Ser. A452, 1207-1220 (1996) and clearly elucidated for the more general reader by M. D. Simon, I. O. Heflinger and S. L. Ridgway, "Spin stabilized magnetic levitation". Am. J. Phys. 65(4), 286-292 (1997). The opposing magnetic polarity (magnetization directions) of the spignet and base provide the basic lift to support the spignet against gravity. The interaction of the magnetic fields creates a well or trap (a couple of field lines B are sketched in FIG. 1b) that prevents the spignet from moving laterally and so confines it over the base magnet. The principle of the conservation of angular momentum prevents the spignet from flipping over, and so it is spin-stabilized. Any deviation of the spin axis from the vertical results in precession and nutation, like a spinning top or mechanical gyroscope toy. M. V. Berry also drew attention to the similarity between the Levitron and the Paul trap for neutral magnetic particles.

The conventional device described above, will be referred to herein as a vertical axis levitation device or VAL. Although some debate took place about the possibility of operating a horizontal axis levitation device (HAL), it was uncertain as to whether this would even be possible.

"Levitation device" is understood to mean a freely spinning magnetic top, supported by a fixed magnets. All devices that have a mechanical point of contact are excluded. Also excluded are so-called "Levitrons" which employ electromagnets, super-conductors, Lenz's law or diamagnetic materials. So-called new "Levitrons" achieve impressive feats, such as horizontal or suspended levitation, but they require electrical power and/or computer control, so are not passive.

In this context, 'vertical' refers to the direction parallel to the local gravitational field, and 'horizontal' refers to a direction perpendicular thereto. Of course, the axis of the invention need not be precisely horizontal (and in practice cannot be because of precession, however small), but is substantially horizontal, such as within 10 degrees of horizontal.

According to the present invention, there is provided a levitation devive as defined in claim 1.

Embodiments of the invention will now be described, by way of example only, with reference to the accompanying drawings, in which.

We report the first demonstration of a horizontal axis levitation device (HAL) and show how its behavior is similar to the vertical axis levitation device (VAL) in some expected respects but very different in others.

What was needed to achieve horizontal-axis operation, was a totally different approach to the triple problem of supporting the spignet against gravity, of confining it in a macro-trap and most importantly of organizing the horizontal field for a precessional micro-trap.

Figure 1A:
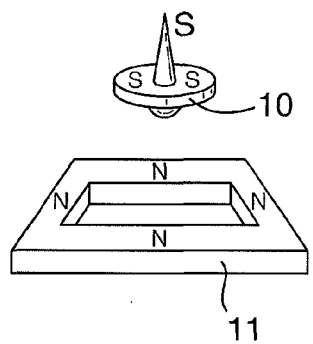
FIGS. 1a and 1b show examples of conventional vertical axis levitation devices.
Figure 1B:
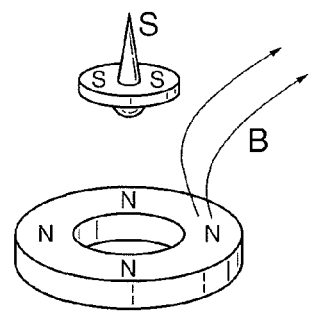
Figure 2:
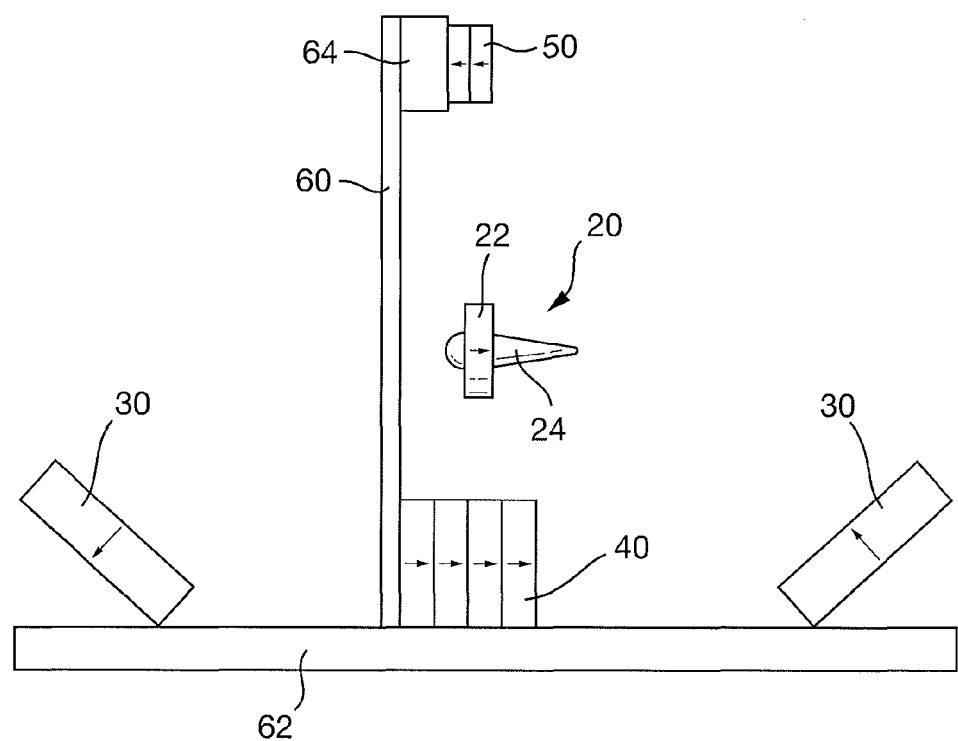
FIG. 2 shows a horizontal axis levitation device according to an embodiment of the invention, viewed sideways with respect to the spin axis.

FIG. 2 illustrates one embodiment of the invention. The levitating object 20 comprises a cylindrical, disc-shaped or annular magnet forming the spignet 22. A spindle 24 is provided to enable it to be spun between fingers and thumb and then released. The spindle axis is parallel and coincident with the axis of the annular magnet, and defines an axial direction. The magnetization direction of the spignet 22 is also parallel to the axial direction, and is indicated by an arrow. In preferred embodiments, the magnet is primarily magnetized in a single direction. In this figure, magnetization directions of the permanent magnets forming the device are shown by arrows, but the absolute directions of the arrows are arbitrary, for example all directions could be reversed (i.e. all north magnet poles swapped with south magnetic poles, and vice versa).

A pusher magnet arrangement comprising two inclined slab magnets 30 is provided, as illustrated. These generate the horizontal field for the micro-trap; they also contribute to lift, as will be described further below with reference to FIG. 4a-b. The inclination of the magnets 30 can be adjustable by means of supports, not shown.

Beneath the spignet 22 is a lifter magnet arrangement 40. In this embodiment it comprises a stack of permanent magnets, but it could be a single permanent magnet. It is longer in the axial direction than the spignet 22. The lifter magnet arrangement 40 is magnetized parallel to the magnetization direction of the spignet 22. Thus, the lifter magnet arrangement 40 repels the spignet 22, and this provides a component of the force that levitates the spignet 22 against the force of gravity. In this embodiment, the lifter magnet arrangement also provides lateral confinement of the spignet, as will be described below with reference to FIGS. 3a-c.

With the arrangement described so far, horizontal axis levitation is still problematic. The trick to get to HAL is to provide a puller magnet arrangement 50 above the position at which the spignet 22 will levitate. The puller magnet arrangement 50 has a magnetization direction antiparallel to the spignet 22, and so creates an attractive force between the spignet and the puller magnet. Thus the spignet can be suspended in the field of the puller magnet 50, so that it can oscillate axially. The puller magnet helps to create a potential well that allows the spignet 22 to oscillate along the horizontal axis like the bob of a pendulum.

In the preferred embodiment shown in FIG. 2, a vertical non-magnetic plate 60 (viewed edge-on) is provided on a base 62. The plate 60 is preferably transparent to facilitate viewing of the spignet, and can be made of perspex/plexiglass or similar material. In this embodiment, the plate 60 supports the puller magnet arrangement 50. However, the plate 50 provides a surface on which to press the object 20 when spinning it manually by the spindle 24 to launch the levitation. In other embodiments, the plate 60 can be removable entirely, or hinge out of the way, or have an openable door or flap, to emphasise the levitation without support.

The puller magnet arrangement 50 can be supported by other means, such as stiff wires or a support arm or frame, fixed to the base 62.

A further enhancement consists of mounting the puller magnet arrangement 50 between 0.5 and 2 cm away from the supporting plate 60, such as about 1 cm, by means of a spacer 64, so that the spignet is given a chance of falling (axially) into the horizontal trap after it has been set spinning against the plate and released. The puller magnets 50 behave like a pendulum support with the spignet bouncing to and fro of a vertical line drawn between the puller magnets and situated about 1.5 cm from the vertical plate. After a few oscillations, the spignet settles down in the axial potential well. To the unaided eye it appears to be perfectly horizontal and stationary. After some 30 seconds, as air resistance slows the spignet, it starts to gently wobble. After one minute, the wobbles grow and the spignet eventually jumps onto one of the trapping magnets.

Figure 3A:
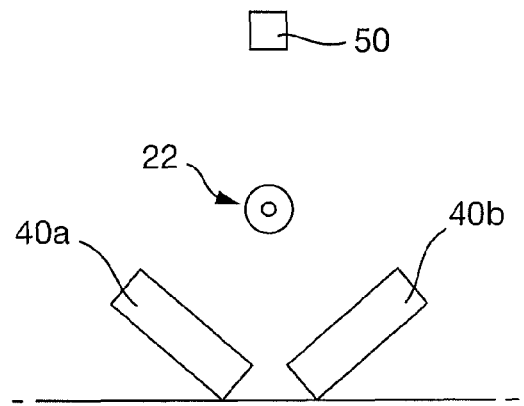
FIGS. 3a-3c are schematic illustrations of possible lifter magnet arrangements according to embodiments of the invention, viewed along the direction of the spin axis.
Figure 3B:
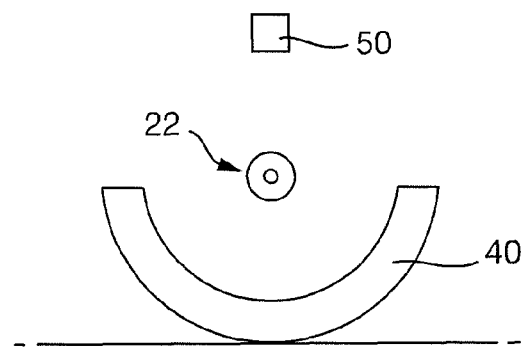
Figure 3C:
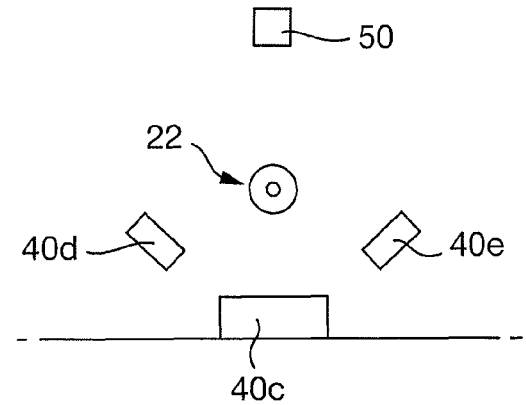

Refering to FIGS. 3a, 3b and 3c, these show simplified views along the axial direction including the spignet 22, puller magnet arrangement 50, and various embodiments of the lifter magnet arrangement 40. In FIG. 3a, two lifter magnet blocks 40a and 40b and provided in a V-shape. In FIG. 3b a U-shaped, or trough-shaped, or half-ring magnet 40 is located beneath the spignet 22. In FIG. 3c, a magnet 40c is directly beneath the spignet 22, and two further outrigger magnets 40d and 40e are positioned higher up and to either side. A common feature of these lifter magnet arrangements is that there is a recess under the position of the spignet, with magnets or portions of magnets to either side that are higher than any magnet directly beneath the spignet. This provides lateral confinement of the spignet in addition to the lift.

Combinations of selected features of the arrangements of FIG. 3 are possible, such as a V-shaped configuration for lift as in FIG. 3a, in combination with outrigger magnets 40d, 40e of FIG. 3c. The outrigger magnets can be attached to the plate 60, where provided, or can be supported in any suitable way.

Figure 4A:
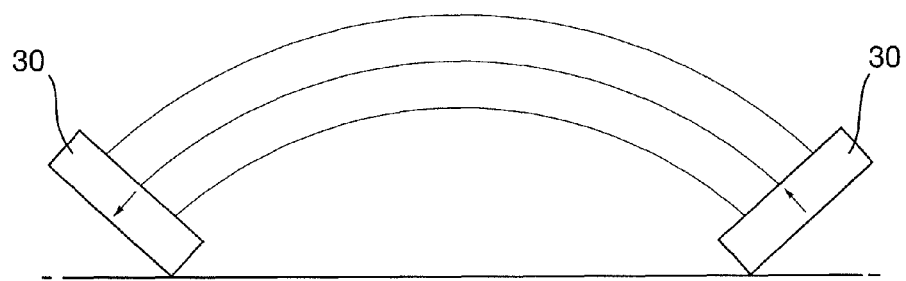
FIGS. 4a and 4b are illustrative sketches of portions of the magnetic field of the pusher magnets, without and with the spignet.
Figure 4B:
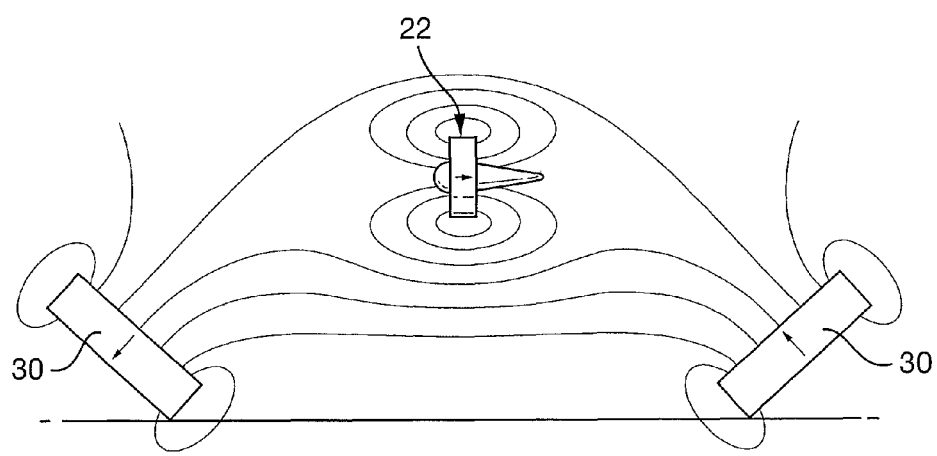

FIG. 4a is a sketch of a few of the magnetic field lines between the two pusher magnets 30, in the absence of any other magnets. As can be seen, because of the inclination of the pusher magnets 30, the field lines are arched upwards, and at the central position where a spignet would be located, the magnetic field is horizontal. When the spignet 22 is introduced, the magnetic field is distorted, as sketched in FIG. 4b. The interaction between the pusher magnets 30 and the spignet 22 creates a potential well such that it is energetically unfavourable for the spignet to move axially (to the left or right as illustrated in FIG. 4b). This confines or traps the spignet axially. Or considered in another way, if the spignet is displaced axially, it experiences a restoring force that tends to return it to the central position. The magnetic field of the pusher magnets 30 also provides a component of lift to the spignet, because of the mutual repulsion between the spignet and the pusher magnets.

With the HAL disclosed herein, Earnshaw's theorem is by-passed in two ways: by creating a micro-trap in which the spinning magnet or magnets precess about the field lines; and by superposing a macro-trap which allows for inclination. The micro and macro-trap operate on different time scales.

To understand horizontal axis levitation it is helpful to examine the physics of the phenomenon. This can be done by comparing it to the vertical axis case.

Once horizontal operation became reliable, some of the experiments carried out with a laser pointer on the vertical axis system were repeated. Berry, and Simon, Heflinger and Ridgway (henceforth SHR), all contend that without precession, there is no trapping, This can be laser-visualized with the VAL by observing the reflected beam a few seconds after launch. A small angle of precession of order one degree is always present.

FIG. 5 shows the trace of a laser beam reflected off the spignet onto a screen for a HAL. FIG. 5a is an early undisturbed trace showing small angle precession. HAL behaves identically to VAL, confirming that the micro-trap mechanism is the same.

Figure 5A:
FIGS. 5a-5f are illustrations of the trace of a laser spot obtained by reflecting a laser pointer beam off a spignet in an embodiment of the invention.
Figure 5B:

After about 45 seconds, the behavior of HAL is also the same: the small precession amplitude grows as seen with the laser trace FIG. 5b.

Figure 5C:
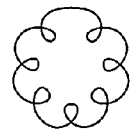
Figure 5D:
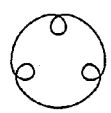
Figure 5E:
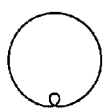
Figure 5F:

HAL and VAL also share the same behavior when deliberately disturbed, either by "mis-launching" or by swiping a small magnet past the spignet. FIG. 5c: nutational loops caused by deliberately mis-launching the spignet or by passing a disturbing magnet in its vicinity. Sequence FIG. 5d-f: the number of loops reduces as the spignet spin slows (three loops in FIG. 5d), until finally only one small loop remains (FIG. 5e), and grows quickly (to almost the same size as the precessional loop, FIG. 5f) just before the spignet escapes from the trap. This is also indistinguishable from the vertical axis case.

What is very different is the size of the HAL magnetic trap. The extremely involved VAL calculations of Berry and SHR (too detailed for inclusion here) show that the crucial trapping mechanism is similar to that of a toy top, with precession ensuring that the top doesn't fall over, but with much more complicated magnetic field considerations. The result is that the VAL trap is very weak and requires millimeter precision. With HAL, gravity is in a sense replaced by the horizontal field of the large slab magnets and the confinement is partially due to the puller magnet field.

The important point is that the HAL trap is much more generous. The spignet can jump around inside it, in a way never seen with VAL. It is also much easier to launch for the same reason.

Indeed, some of the latest commercially available VAL toys are so difficult to operate, that many children and parents "give up".

The older VALs hovered at lower altitude but were easy to launch. HAL can be the same or better.

Potential Applications are as follows:
1. An executive toy.
2. An educational device. The levitation device is analogous to NMR-MRI, anti-matter traps, particle traps, space-craft motion, that of most dense bodies in the Universe (from ordinary stars to neutron stars and pairs of black holes). The motion can be visualized by reflecting the beam of a laser pointer off the spignet, which produces beautiful Lissajous-like figures on a screen. It is able to mimic the non-quantum mechanical dynamics of NMR-MRI and of the anti-hydrogen ALPHA trap at CERN. Anti-hydrogen research is one of CERN's leading activities. Levitation device precession and nutation are analogous to the precession and nutation of spacecraft, our own Earth and Moon and most solid and some fluid rotating bodies in our Universe.

3. Levitation-inspired near frictionless bearings could be developed by coupling two or more HAL's together. These could find use in household size electro-mechanical appliances or in industrial scale devices or—most importantly—in MEMS, where friction is known to be a major problem.

The first and easiest is as an executive toy. Levitation devices of all kinds are quite popular. A new version is sure to attract initial interest. Two of HAL's features could convert this interest into something more enduring: the fact that it is much easier to operate, once correctly set up; also, the fact that it could be made to operate at all inclination angles.

The second realm is education: trapping is becoming a vast subject in science with considerable practical applications. (Bose-Einstein condensates, antimatter, cell-biology, MEMS etc). Study of the Levitation device automatically leads to trapping concepts such as the depth of the wells, quasi-adiabatic conditions, maximum energy etc. Reflecting an everyday laser pointer off the spinning top or "spignet" illustrates the complex rotary motion of space-craft, moons (including our own), planets, main sequence stars, neutron stars and even pairs of black holes. All these bodies precess and to a lesser degree nutate. And as mentioned above, Levitation device precession is also an excellent introduction to NMR-MRI. Finally, precession is central to the function of old fashioned gyroscopes.

The third realm of application is opened up by the present invention. Current levitation devices are toys. But the HAL principle could easily lead to much more complex multi-component but contactless systems. In the prior art, a spinning magnetic top was levitated over a precisely leveled permanent magnet base so that its axis of rotation was as close to the vertical as the necessary small angle precession would allow. Given this obligatory vertical axis requirement, it was hard to imagine how the levitation principle could be applied to electrical devices such as motors, generators or MEMS devices. Now that horizontal axis levitation has been demonstrated, it can be applied, for example to large electromechanical devices or household appliances or to MEMS. The great advantage of a levitation device technology-inspired bearing is that it is as near frictionless as air resistance will allow.

Nor are the required permanent magnets as expensive as the competing super-conducting or computer controlled "frictionless" bearings. The so called new "Levitrons" are electrically powered devices which do not have the elegant simplicity of the original. The alternative diamagnetic suspensions require either very, very powerful magnetic fields or remain confined to very small volumes.

Figure 6:
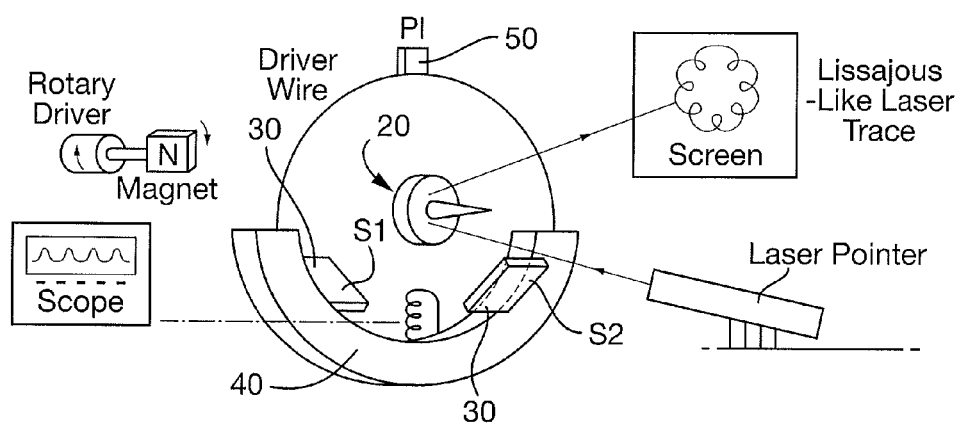
FIG. 6 shows a horizontal axis levitation device according to a further embodiment of the invention.

For the first use, as an executive toy, by replacing the complicated set of magnets with just four, a saleable executive toy can be developed. FIG. 6, is a sketch of just one example of what such a toy might be: there is one confining/lifting half-ring magnet and two inclined slabs. Adjustments are made with the small puller magnet.

For educational purposes, optionally, a laser pointer can be added and a camera to take pictures of the precession and nutation patterns when the laser beam is reflected off the spignet onto a screen. A small optical sensor can be placed next to the levitation device to measure the rate of rotation of the spignet. The rate of rotation can be stabilized or adjusted with a small coil connected to an a.c. power supply (not shown). A rotary driver magnet (such as a small slab magnet) can be used to control the amplitude of the precession or nutation. The spignet can be driven in and out of precession by the rotary driver, which is made to rotate just above and just below the precession frequency. At the flick of a switch the spignet can be made to nutate, illustrating the nutational behavior of a range of bodies in our macroscopic and our microscopic Universe.

The same educational system—somewhat simplified—could be displayed in MRI hospital reception area to explain to practitioners and the general public, how NMR-MRI actually works.

Figure 7A:
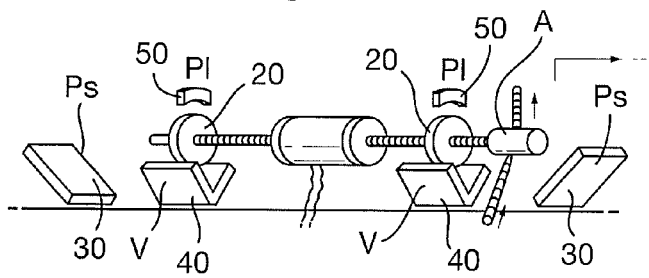
FIGS. 7a and 7b illustrate further embodiments of the invention at macroscopic and microscopic scales.
Figure 7B:
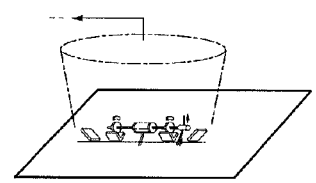

Two final embodiments operate at large and microscopic scales and are sketched in FIGS. 7a and 7b, respectively. The large scale device has two (low friction) levitation device-inspired bearings, supporting a central electro-mechanical system, and can comprise an industrial scale motor. The microscopic device is the same, but on a sub-micron scale and is able to overcome the strong frictional and Casimir forces which are a well-known problem with MEMS (micro-electro-mechanical systems). Several spignets could be placed in series to support a central section. The supported section could be an alternator, d.c. motor, generator, fly-wheel or gyroscope. The resulting low friction device could be coupled to the application electro-mechanically or by fluid or air transmission to reduce all frictional losses.

The invention claimed is:

1. A levitation device including an object levitatable at a predetermined position, wherein the object comprises a spinning magnet, the spinning magnet having a substantially horizontal spin axis defining an axial direction and the spinning magnet having a magnetization direction parallel to the spin axis, the device further comprising:
   a pusher magnet arrangement configured to produce a magnetic field at the predetermined position that is in the opposite direction to the magnetization direction of said spinning magnet;
   a lifter magnet arrangement lower than and to either side of the predetermined position, having a magnetization direction parallel to the magnetization direction of the spinning magnet, and having a recess under the predetermined position; and
   a puller magnet arrangement above said predetermined position and having a magnetization direction antiparallel to the magnetization direction of the spinning magnet.

2. A device according to claim 1, wherein the pusher magnet arrangement comprises a pair of pusher magnets spaced apart in the axial direction either side of the predetermined position.

3. A device according to claim 2, wherein each pusher magnet is magnetized with a horizontal component of magnetization that is in the opposite direction to the magnetization direction of the spinning magnet, and is inclined to have a vertical component of magnetization, such that the magnetic field between the pusher magnets is arched upward in the absence of other magnets.

4. A device according to claim 1, wherein the lifter magnet arrangement comprises one or more magnets arranged in a V-shape or U-shape to provide the recess, such that the spinning magnet is laterally confined by the resulting magnetic field.

5. A device according to claim 1, further comprising a non-magnetic plate, said axial direction being substantially perpendicular to the plate, and the plate being provided at a location displaced in the axial direction from the predetermined position.

6. A device according to claim 1, wherein the puller magnet arrangement is mounted to the plate, but spaced apart therefrom, so as to be above the predetermined position.

7. A device according to claim 6, wherein the puller magnet arrangement is spaced apart from the plate by a distance in the range of from 0.5 to 2 cm.

8. A device according to claim 1, wherein each magnet arrangement comprises one or more permanent magnets.

9. A device according to claim 1, wherein at least one of the magnet arrangements comprises a stack of permanent magnets.

10. A device according to claim 1, wherein the levitatable object comprises a spindle for manually spinning it about its axis.

11. A device according to claim 1, wherein the axial direction is within 10 degrees of horizontal.

12. A device according to claim 1, wherein the spinning magnet is magnetized in a single direction.

13. A device according to claim 1, wherein the spinning magnet is free to precess and/or nutate.

14. A device according to claim 1, comprising a plurality of said levitatable objects coupled in series axially, each provided with a respective lifter magnet arrangement and puller magnet arrangement.

15. A device according to claim 14, further comprising an electro-mechanical system rotatably supported by said plurality of levitatable objects.

* * * * *

UNITED STATES PATENT AND TRADEMARK OFFICE
CERTIFICATE OF CORRECTION

| | |
|---|---|
| PATENT NO. | : 9,336,935 B2 |
| APPLICATION NO. | : 14/416708 |
| DATED | : May 10, 2016 |
| INVENTOR(S) | : Maximilian Michaelis |

It is certified that error appears in the above-identified patent and that said Letters Patent is hereby corrected as shown below:

In the specification,

Column 6, Line 19

"elcctro-mechanical" should be: --electro-mechanical--

Signed and Sealed this
Second Day of August, 2016

Michelle K. Lee
*Director of the United States Patent and Trademark Office*